US008400623B2

(12) United States Patent
Kasturi et al.

(10) Patent No.: US 8,400,623 B2
(45) Date of Patent: Mar. 19, 2013

(54) MACHINE AND METHOD FOR MEASURING A CHARACTERISTIC OF AN OPTICAL SIGNAL

(75) Inventors: Prakash Kasturi, Rancho Santa Margarita, CA (US); Adrian Nastase, Huntington Beach, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 13/294,929

(22) Filed: Nov. 11, 2011

(65) Prior Publication Data

US 2012/0057153 A1    Mar. 8, 2012

Related U.S. Application Data

(63) Continuation of application No. 11/621,036, filed on Jan. 8, 2007, now Pat. No. 8,072,587.

(60) Provisional application No. 60/760,444, filed on Jan. 20, 2006.

(51) Int. Cl.
*G01J 1/00* (2006.01)

(52) U.S. Cl. ........................................................ 356/121

(58) Field of Classification Search .................. 356/121, 356/213, 229, 388
See application file for complete search history.

(56) References Cited

U.S. PATENT DOCUMENTS

| | | | |
|---|---|---|---|
| 3,761,185 A | 9/1973 | Blackwell | |
| 4,469,943 A | 9/1984 | Turnbull | |
| 4,526,470 A | 7/1985 | Kaye | |
| 5,267,013 A | 11/1993 | Spence | |
| 5,513,029 A | 4/1996 | Roberts | |
| 5,909,278 A | 6/1999 | Deka et al. | |
| 6,426,497 B1 | 7/2002 | Martinez et al. | |
| 6,541,754 B2 | 4/2003 | Matsuyama | |
| 6,653,613 B1 | 11/2003 | Bucourt et al. | |
| 6,704,920 B2 | 3/2004 | Brill et al. | |
| 6,963,681 B2 * | 11/2005 | Mao et al. | 385/27 |
| 7,002,131 B1 | 2/2006 | Lewis | |
| 7,102,738 B2 | 9/2006 | Matsuura et al. | |
| 7,164,131 B2 | 1/2007 | Phelan, Jr. | |
| 8,072,587 B2 * | 12/2011 | Kasturi et al. | 356/121 |
| 2002/0014886 A1 | 2/2002 | Matsuyama | |
| 2002/0030153 A1 | 3/2002 | Matsuyama | |
| 2003/0127588 A1 | 7/2003 | Martinez | |
| 2004/0039377 A1 | 2/2004 | Feige et al. | |
| 2006/0266943 A1 | 11/2006 | Phelan, Jr. | |

(Continued)

FOREIGN PATENT DOCUMENTS

WO    WO 2007087144 A2 *    8/2007

OTHER PUBLICATIONS

European Patent Office, Supplementary European Search Report, EP App. No. 07710380.6, Oct. 12, 2010, 7 pages.

(Continued)

*Primary Examiner* — Roy M Punnoose
(74) *Attorney, Agent, or Firm* — Stoel Rives LLP

(57) ABSTRACT

Machines and methods measure an unknown characteristic of an optical signal incident upon a detector characterized by one or more dynamic response parameters. One method receives an output signal from the detector and compares that output signal and a computationally determined response of the detector to a known optical signal incident upon the detector. The response is based on said one or more dynamic parameters. The method determines the unknown characteristic based on the comparison of the output signal and the computationally determined response of the detector. Another method receives an output signal from an optical detector detecting one or more optical signals, accesses a predetermined characteristic curve of detector response, compares the output signal from the detector to the predetermined characteristic curve of detector response, and calculates at least one unknown characteristic of one or more optical signals based on results of the comparing step.

14 Claims, 8 Drawing Sheets

U.S. PATENT DOCUMENTS

2007/0171403 A1   7/2007   Kasturi et al.

OTHER PUBLICATIONS

Bryant P. et al., Advanced Test and Calibration Systems for Integrated Multisensor Platforms with Infrared, Visible, and Laser Range Finder/Designator Capabilities, Proc. of SPIE vol. 5076, Oct. 16, 2003, pp. 233-241.

National Institute of Standards and Technology, Optical Radiation Measurements, Mar. 13, 2005, 8 pages.
International Searching Authority, International Patent Application No. PCT/US2007/000314, International Search Report and Written Opinion, Jun. 22, 2007, 7 pages.
U.S. Appl. No. 11/621,036, filed Jan. 8, 2007.
Oppenheim et al., "Signals and Systems," (Englewood Cliffs NJ, 1983), 4 pp.

* cited by examiner

MACHINE AND METHOD FOR MEASURING A CHARACTERISTIC OF AN OPTICAL SIGNAL

RELATED APPLICATIONS

This application is a continuation of and claims priority to U.S. patent application Ser. No. 11/621,036, also entitled "Machine and Method for Measuring a Characteristic of an Optical Signal," filed Jan. 8, 2007, which claims priority from U.S. Provisional Patent Application No. 60/760,444, filed Jan. 20, 2006. Both of the foregoing patent applications are hereby incorporated by reference in their entireties.

TECHNICAL FIELD

This disclosure relates generally to measurement of light and more particularly, but not exclusively, to measurement of a characteristic, such as power or energy, of an optical signal, such as a laser pulse.

BACKGROUND INFORMATION

Optical power or energy meters measure the power and/or energy from a light source, such as a laser. A typical optical meter utilizes a light sensor or detector that converts an optical signal into an electrical signal, such as a voltage signal. Typical detectors include pyroelectric detectors, which are based on the pyroelectric effect of ferro-electric crystals to produce a voltage output signal proportional to the optical energy incident on the detector, and thermopile detectors, which employ thermocouples to produce a voltage output signal proportional to the power in an optical signal incident on the detector.

Conventional optical meters measure the optical signal's attributes by directly observing the detector's output signal and extracting information from that output signal alone. For example, a pyroelectric detector's peak output voltage measured from the signal's baseline is proportional to the optical energy in a pulse incident upon the detector, provided the laser pulse width is small enough that it can be assumed to be an impulse. Circuitry can register that peak voltage and thereby provide a measure of the optical pulse energy. However, the dynamic response of the detector limits how quickly such measurements can be taken, especially when the optical signal incident upon the detector comprises a train of periodic pulses, as is typically the case. Present optical meters are thus limited to operate at pulse repetition rates less than about 2 kHz (2000 pulses per second) in most circumstances.

SUMMARY OF THE DISCLOSURE

According to one embodiment, a method measures an unknown characterized of an optical signal incident upon a detector characterized by one or more dynamic response parameters. The method receives an output signal from the detector and compares that output signal and a computationally determined response of the detector to a known optical signal incident upon the detector. The response is based on said one or more dynamic parameters. The method determines the unknown characteristic based on results of the comparison.

According to another embodiment, a machine measures an unknown characteristic of an optical signal incident upon a detector characterized by one or more dynamic response parameters. The detector produces an output signal in response to the optical signal being incident upon the detector. The machine comprises an interface to the detector, a memory, and a processor. The interface is for receipt of the output signal. In the memory are stored data related to said one or more dynamic parameters. The processor, which is connected to the memory and to the interface, is configured to compare the output signal from the detector to a calculated response of the detector to a known signal, the processor further being configured to determine, on the basis of the comparison, the unknown characteristic.

According to yet another embodiment, a non-transitory computer-readable storage device is provided for use with a machine for measuring an unknown characteristic of an optical signal incident upon a detector characterized by one or more dynamic response parameters. The detector produces an output signal in response to the optical signal being incident upon the detector. The machine includes an interface to the detector for receipt of the output signal, a memory in which are stored data related to said one or more dynamic response parameters, and a processor connected to the memory and to the interface. The processor operates according to program instructions embedded on the computer-readable storage device. Included are instructions to compare the output signal from the detector to a calculated response of the detector to a known, and instructions to determine, on the basis of the comparison, the unknown characteristic.

According to still another embodiment, a system is provided for measuring an unknown characteristic of an optical signal incident upon a detector characterized by one or more dynamic response parameters. The system includes a means for receiving an output signal from the detector, a means for comparing the output signal and a computationally determined response of the detector to a known optical signal incident upon the detector (thereby producing a comparison), and a means for determining the unknown characteristic based on the comparison. The computationally determined response is based on said one or more dynamic response parameters.

According to yet another embodiment, a method receives an output signal from an optical detector detecting one or more optical signals, accesses a predetermined characteristic curve of detector response, compares the observed output signal from the detector to the predetermined characteristic curve of detector response, and calculates at least one unknown characteristic of one or more optical signals based on results of the comparison.

According to still another embodiment, a machine measures an unknown characteristic of one or more optical pulses having a known pulse repetition rate and incident upon an optical detector characterized by one or more dynamic response parameters. The machine includes an input connection for receiving an output signal from the detector that results from the pulses being incident upon the detector, a memory in which are stored data related to said one or more dynamic response parameters, and a processor operatively connected to the memory and to the input connection. The processor is configured to calculate, on the basis of the stored data, a response of the detector to a train of optical pulses having the known pulse repetition rate and a known energy. The processor is further configured to compare the output signal from the detector to the calculated response and to measure the unknown characteristic on the basis of that comparison.

Details concerning the construction and operation of particular embodiments are set forth in the following sections with reference to the below-listed drawings.

DETAILED DESCRIPTION OF EMBODIMENTS

With reference to the above-listed drawings, this section describes particular embodiments and their detailed construction and operation. As one skilled in the art will appreciate, certain embodiments may be capable of achieving certain advantages over the known prior art, including some or all of the following: (1) measurement of pulse trains having higher pulse repetition rates is possible; (2) measurements are unconstrained by a detector's dynamic response; (3) measurements, at least preliminary measurements, can be obtained quickly, without having to wait for the detector's response to settle; (4) measurement accuracy and confidence can increase over time; and (5) slower, less expensive data acquisition hardware can be utilized without unduly sacrificing performance. These and other advantages of various embodiments will be apparent upon reading the following.

Figure 1:
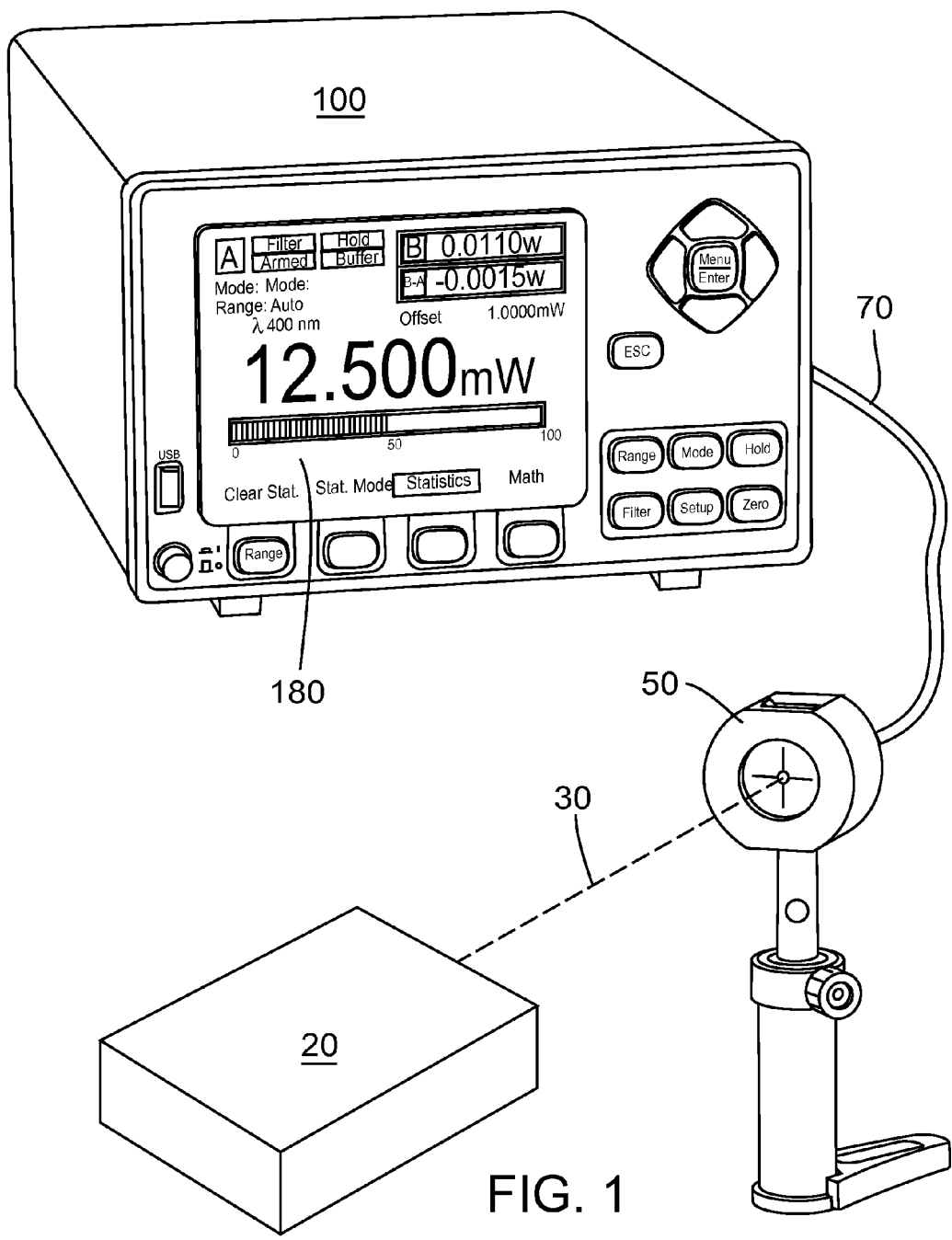
FIG. 1 is a diagram of a laser, detector, and optical meter according to one embodiment.

FIG. 1 is a diagram of an optical source 20, a detector 50, and an optical meter 100 according to one embodiment in one representative configuration. The meter 100 may comprise a display 180 to present measurement results or other information and/or input mechanisms, such as buttons or controls for a user to input data, make selections, or otherwise operate the meter 100. The arrangement of the display and input mechanisms illustrated in FIG. 1 is just one possible arrangement. The optical source 20 is usually a laser that generates a laser beam that propagates along a propagation path 30 to the detector 50. The laser beam may be a pulsed laser beam with pulses occurring at a pulse repetition rate. Each pulse is characterized by a pulse width. The pulse repetition rate and/or pulse width may be known a priori from the nature of the laser 20, before any measurements are taken, or they may be measured by the meter 100 or external equipment.

A cable 70 connects the detector 50 to the meter 100. The cable 70 conveys the detector's output signal to the meter 100 and may also convey other data, such as dynamic response data for the detector 50, to the meter 100. For example, the cable may be a USB (universal serial bus) cable. Alternatively, the detector 50 may communicate wirelessly with the meter 100. The nature of the connection between the detector 50 and the meter 100 is immaterial, so long as it conveys at least the detector's output signal to the meter 100. Multiple detectors (not shown) may connect to the same meter 100, and various meters of the same or different type may be swapped in and out of connection with the meter 100. The detector 50 may be integral with the meter 100 or separate from the meter 100, as shown. The detector 50 may be made by the same or different entity as the meter 100. As a marketing matter, the detector 50 and/or the cable 70 may be bundled with the meter 100 as a suite or system of measurement equipment.

Figures 2, 3:
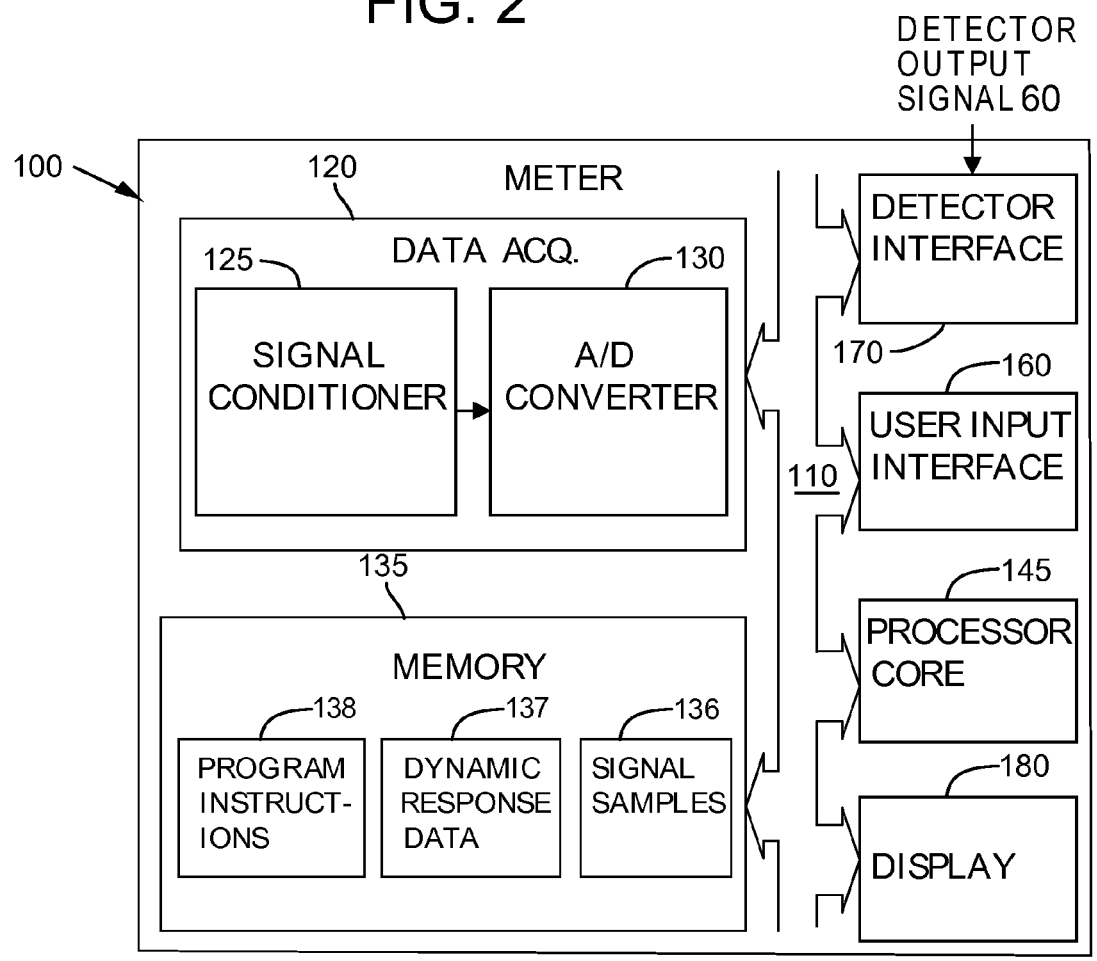
FIG. 2 is a functional block diagram of the components shown in FIG. 1.
FIG. 3 is a more detailed block diagram of the optical meter in FIGS. 1 and 2.

FIG. 2 is a block diagram of the components pictured in FIG. 1, according to one embodiment. The optical source 20 emits an optical signal 35, which is received by the detector 50, which in turn generates an electrical output signal 60, which may be, for example, a voltage or current signal, depending upon the nature of the detector 50. The output signal 60 is input to the meter 100. The meter 100 preferably comprises a data acquisition module 120, signal processor 140, and a display 180. Other versions of the meter 100 may have less than all of these components and/or may contain other components.

A more detailed block diagram of one illustrative architecture of the meter 100 is depicted in FIG. 3. In FIG. 3, a bus-based architecture is illustrated, based on a bus 110. A number of other components interface to the bus 110, including the data acquisition module 120, a memory 135, a processor core 145, a user input interface 160, a detector interface 170, the display 180, and possibly other components not illustrated, such as, for example, pulse rate measuring circuitry or a reference signal input interface. The data acquisition module 120 is shown in some additional detail and will be discussed further below. Broadly speaking, the data acquisition module 120 writes detector output data samples into a signal samples area 136 of the memory 135, which also stores dynamic response data for the detector 50 in a memory area 137 and program instructions in another memory area 138. The processor core 145 is where all or most processing occurs. The user input interface may contain drivers for interfacing with various buttons or controls accessible by the user of the meter 100, as shown for example in FIG. 1. The detector interface 170 may be used in some embodiments to receive from the detector 50 data such as the detector's internally stored dynamic response data and possibly to control the detector's operation.

The data acquisition module 120 may contain an analog-to-digital (A/D) converter 130 if the output signal is in analog form. The analog-to-digital converter 130 may include a sample-and-hold or track-and-hold circuit (not shown) to hold the output signal at discrete times as well as a quantizer (not shown) to convert the held values to digital representations. The data acquisition module 120 may also comprise a signal conditioner 125 that contains analog circuitry to amplify, pre-amplify, buffer, and/or condition the output signal 60 before it is converted to digital form. The signal conditioner 125 may not be needed in some cases, for example when the output signal 60 from the detector 50 is suitable A/D conversion without any conditioning. Similarly, the A/D converter 130 may not be needed in some cases, for example when the output signal 60 is already in digital form.

The output signal 60 or a conditioned and/or converted version thereof (hereafter simply called "the output signal 60" regardless whether signal conditioning and/or A/D conversion takes place) is input to the signal processor 140. The signal processor 140 may comprise an input interface for receipt of the output signal 60. The input interface may be a separate component between the signal conditioner 125 and the signal processor 140, or may not be necessary in some implementations of the meter 100. As one example, memory area 136 within a memory 135 into which the data acquisition module 120 writes its digitized samples and from which the signal processor 140 may read those samples, may be utilized as an input interface.

The signal processor 140 may be any form of processor and is preferably a digital processor, such as a general-purpose microprocessor or a digital signal processor (DSP), for example. The signal processor 140 may be readily programmable; hard-wired, such as an application specific integrated circuit (ASIC); or programmable under special circumstances, such as a programmable logic array (PLA) or field programmable gate array (FPGA), for example. Program memory for the signal processor 140 may be integrated within the signal processor 140 or may be an external memory. For example, FIG. 2 shows the memory area 138 for storing program instructions in the memory 135.

The signal processor 140, and more particularly the processor core 145, performs one or more algorithms to extract information from the output signal 60. The extracted information is preferably metrology information regarding one or more characteristics of the output signal 60 and/or the optical signal 35. For example, the signal processor 140 may perform an algorithm to extract from the output signal 60 the power or energy in a laser pulse or train of laser pulses in the optical signal 35. Details of particular algorithms performed by the signal processor 140 are described below with reference to FIGS. 3-6.

The display 180 interfaces with the signal processor 140 and presents in textual and/or graphical form the results calculated by the signal processor 140. The display 180 may also display other information relating to the meter 100. Some versions of the meter 100 may not include the display 180 and may instead provide an interface to send data to another device, which may be a stand-alone display, printer, computer, or the like.

Figure 4:
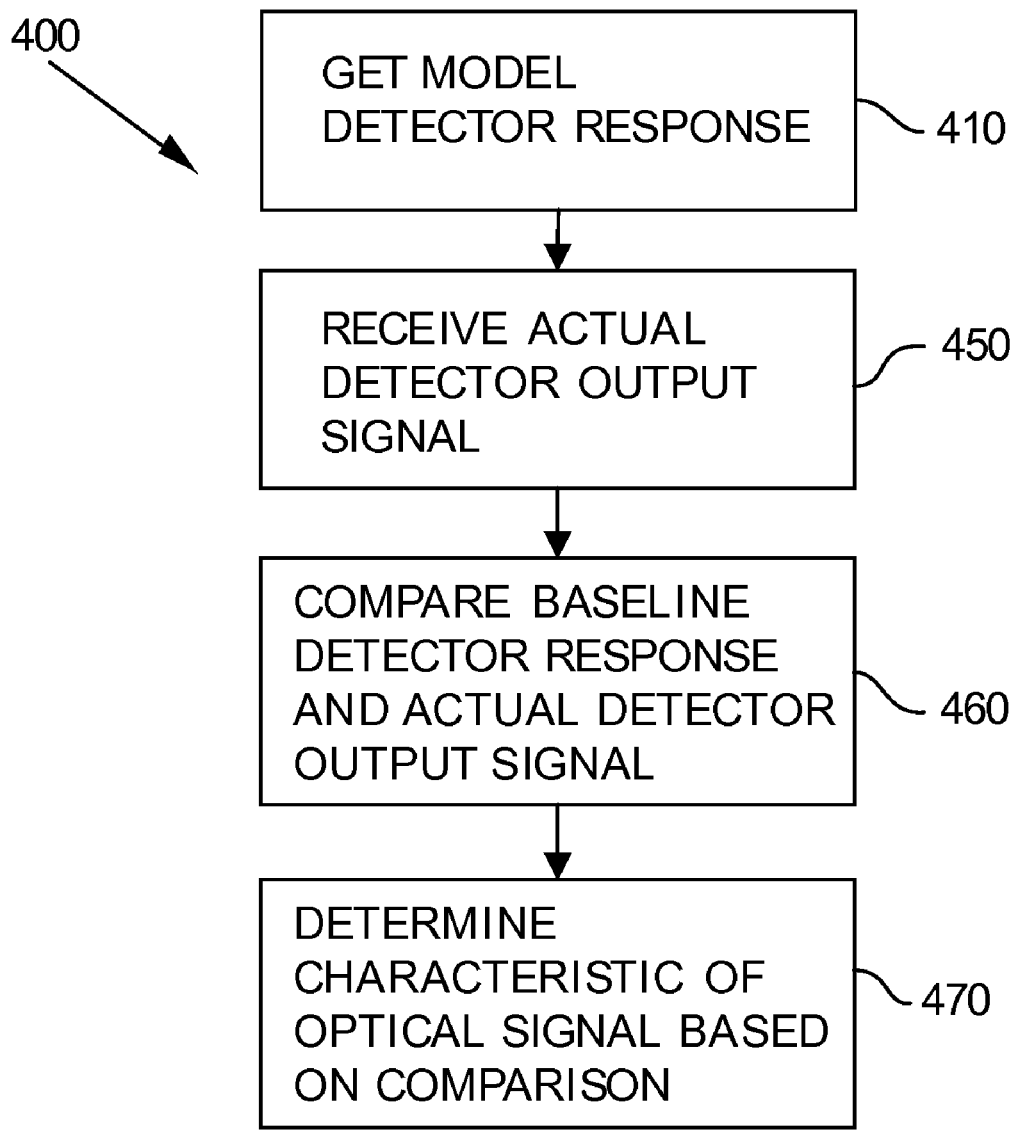
FIG. 4 is a flowchart of a method according to one embodiment.

FIG. 4 is a flowchart of a method 400 preformed by the signal processor 140, according to one embodiment. The method 400 gets (410) a reference or "model" response for the detector 50, that is, the output of the detector 50 when a known optical signal is incident upon the detector 50. In other words, the response obtained in step 410 is the "characteristic curve" of the detector 50. This model response may be computationally determined or empirically determined. If computationally determined, the computations may be performed in advance (i.e., "off line") or as needed (i.e., "on line"). Alternatively, model response may be received by the meter 100 as a reference input signal, and as such need not necessarily be based on any "model" of the detector 50. Details of one version of the model-response-getting step 410 are explained below with reference to FIG. 5 for the case of one particular known optical signal.

The method 400 also receives, measures, acquires, or otherwise observes (450) the actual detector output signal 60 (or "response") when an optical signal 35 to be measured is incident upon the detector 50 and then compares (460) the model response to the observed detector output signal 60. On the basis of that comparison, the method 400 determines (470) one or more characteristics of the optical signal 35. The characteristic to be measured may be any signal characteristic, such as power or energy, for example. Because this approach does not depend upon any assumptions that the observed output of the detector is an undistorted impulse response, this approach is largely unconstrained by the detector's dynamic response and the nature of the input optical signal 35. As a result, useful measurements can be taken under a broader range of conditions, such as higher pulse repetition rate of input signal pulse width.

Figure 5:
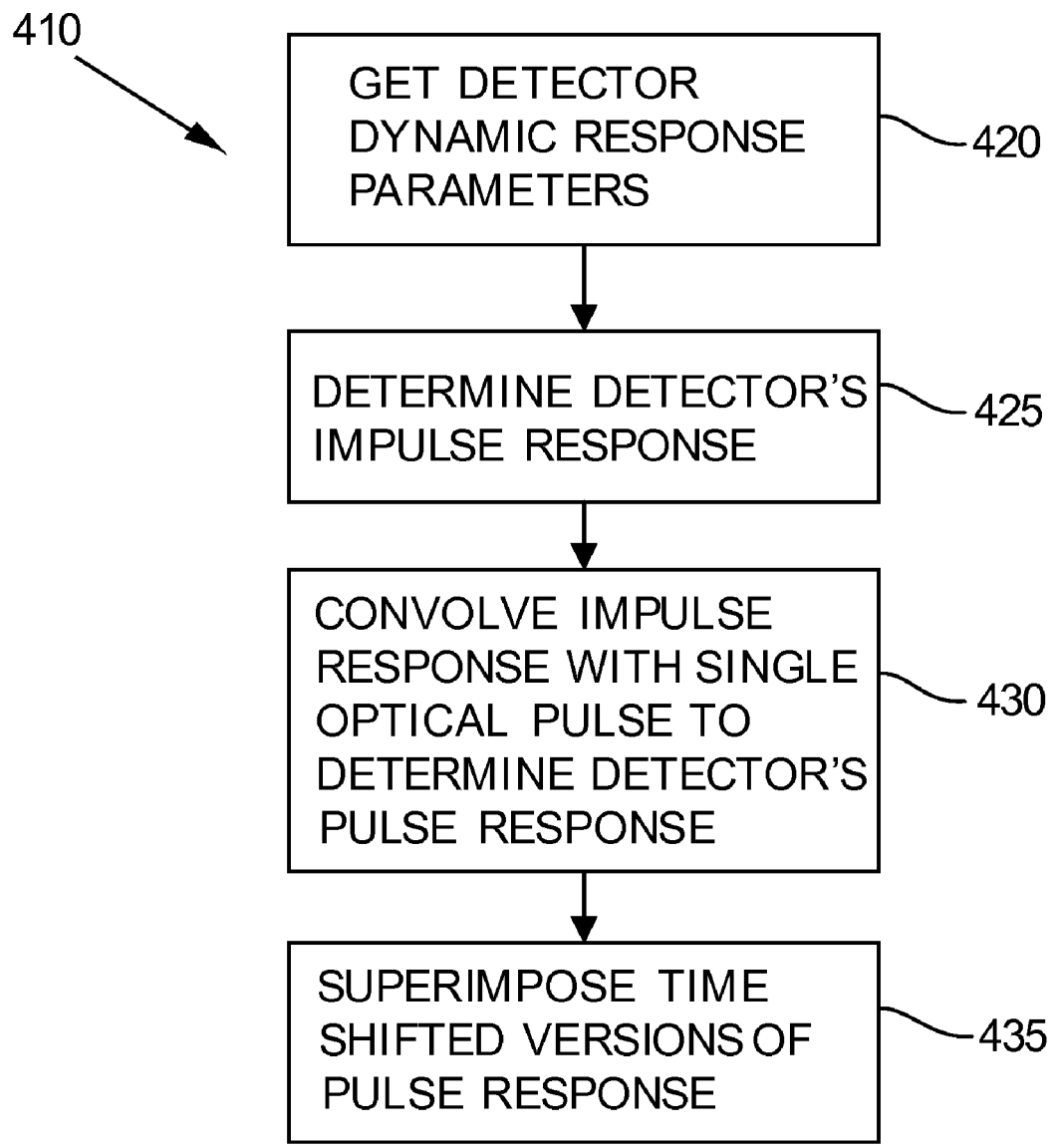
FIG. 5 is a flowchart of one version of one step of the method of FIG. 4.

FIG. 5 is a more detailed flowchart of one version of the model-response-getting step 410 of the method 400. In this version, the known incident optical signal on the detector 50 comprises a single pulse or a train of pulses, such as from a pulsed laser. Such a pulse train has a pulse repetition rate that is either known a priori or may be measured. This version of the model-response-getting step 410 exploits the principles of linear system theory and superposition to computationally determine the detector's model response, derived from dynamic response parameters for the detector 50 and from known characteristics of an assumed input optical pulse train. Specifically, this version of the model-response-getting step 410 gets (420) dynamic response parameters for the detector 50. Those dynamic response parameters, which may comprise DC (direct current) gain, cutoff frequencies, rise time, fall time, settling times, overshoot, break frequencies, natural frequencies, resonant frequencies, damping ratio, poles, zeros, coefficients, nonlinear terms, and the like, may be retrieved via the cable 70 from memory in the detector 50, may be stored in the meter 100 (such as in the dynamic response data area 137 of the memory 135), may be input into the meter 100 by a user (such as via the user input interface 160), or may otherwise be made available to the signal processor 140. Preferably, this data is stored in the detector 50 in accordance with an accepted or standard format.

However obtained, the dynamic response parameters are utilized by this version of the model-response-getting step 410 to determine (425) the detector's impulse response. As is well known in the art, an impulse response is the output of a system when the system's input is an infinitesimally short impulse having unit energy (i.e., a Dirac delta function or unit impulse function). For example, an impulse response h(t) can be expressed in terms of various dynamic response parameters as follows:

$$h(t) = \frac{e^{-\zeta \omega_n t}}{\omega_n \sqrt{1-\zeta^2}} \sin(\omega_n \sqrt{1-\zeta^2}\, t) \quad \text{(Equation 1)}$$

where the dynamic response parameters $\omega_n$ and $\zeta$ are the undamped natural frequency and damping ratio, respectively. The parameters $\omega_n$ and $\zeta$ are related in well-known ways to other dynamic parameters, such as rise time and fall time, which may be readily available for many common models of the detector 50. For example, the undamped natural frequency $\omega_n$ and damping ratio $\zeta$ can be derived from the rise time $T_r$ and fall time $T_f$ as follows:

$$\zeta = \sqrt{\frac{1}{\tan\left(\frac{\pi}{\frac{T_f}{T_r}+1}\right)^2 + 1}} \quad \text{(Equation 2)}$$

and $$\omega_n = \frac{\pi}{T_f \sqrt{1-\zeta^2}}. \quad \text{(Equation 3)}$$

The impulse response in Equation 1 is one well-known expression for an impulse response of an underdamped second order linear system (i.e., when $\zeta<1$). Other formulations of a second-order impulse response are also possible. For example, other gain factors can be included. As another example, when $\zeta>1$, then the second-order linear system is overdamped and the impulse response takes the following form:

$$h(t) = \frac{1}{2\omega_n \sqrt{1-\zeta^2}} \left[ e^{-(\zeta-\sqrt{1-\zeta^2})\omega_n t} - e^{-(\zeta+\sqrt{1-\zeta^2})\omega_n t} \right]. \quad \text{(Equation 4)}$$

As yet another example, a first-order linear impulse response like the following can be utilized to model a detector:

$$h(t) = 1 - e^{-t/\tau} \quad \text{(Equation 5)}$$

where the dynamic response parameter τ is a time constant. These are just two convenient examples of impulse responses. Higher order linear models can be utilized, as can nonlinear models.

According to well known principles of linear system theory, the output y(t) of a system in response to an arbitrary input signal x(t) is the convolution of that input signal with the system's impulse response h(t):

$$y(t) = h(t) * x(t) = \int_{-\infty}^{\infty} x(\Delta) \cdot h(t - \Delta) d\Delta. \quad \text{(Equation 6)}$$

This version of the model-response-getting step 410 exploits that principle by convolving (430) the impulse response determined in step 425 with an assumed input signal consisting of a single pulse of unit energy and other known relevant signal characteristics to determine a single-pulse response. Of course, the computation of the convolution can be approximated using summations over a finite time interval or other numerical techniques. Alternatively, the convolution can be computed in terms of a discrete-time impulse response h[n] and discrete-time or digital signals x[n] and y[n], as follows:

$$y[n] = h[n] * x[n] = \sum_{k=-\infty}^{\infty} x[k] \cdot h[n - k]. \quad \text{(Equation 7)}$$

As an alternative to the convolving step 430, which is a computation in the time domain, various other techniques known to skilled artisans can be utilized to compute the single-pulse response. For example, transform-based techniques (e.g., Fourier, fast Fourier transform (FFT), Laplace, wavelet, and z-transforms) can be utilized to perform an equivalent operation in the frequency or other transform domain.

If the input optical signal 35 has a sufficiently narrow pulse width such that it can be approximated by an impulse function, as is most often the case, then the convolution step 430 can be skipped.

Next, this version of the model-response-getting step 410 superimposes (435) time-shifted versions of the single-pulse response determined in step 430 by additively combining those versions of the single-pulse response, for example, as follows:

$$z(t) = \sum_{T=0}^{M} y(t - T). \quad \text{(Equation 8)}$$

The time shift T between adjacent versions is set to equal or approximate the known pulse repetition rate. If the optical signal or the pertinent portion thereof is a single pulse, then the superimposing step 435 is unnecessary, in which case the model response is the single-pulse response.

Alternatively, the determining step 425 and the convolving step 430 can be replaced by a step that directly provides a single-pulse response based on an analytical form derived in advance for an assumed form of the optical signal 35. As another alternative, the determining step 425, the convolving step 430, and the superimposing step 435 can be replaced by a step that directly provides a pulse-train response based on an analytical form derived in advance for an assumed form of the optical signal 35. An advantage of performing the steps 425, 430, and 435 separately, as depicted in FIG. 5, is flexibility to accommodate different forms of the optical signal 35, such as pulse shape, pulse width, and pulse repetition rate.

In another version of the model-response-getting step 410, a pre-computed characteristic curve for the detector 50 is simply accessed. Such a pre-computed curve may be stored in dynamic response data memory area 137 of the meter 100 or elsewhere. Such a pre-computed curve may be conveyed from the detector 50 to the meter 100. For example, such data may be automatically downloaded as part of the plug-in or start-up procedure for the detector 50 and/or the meter 100. Alternatively, some form of such data may be downloaded from a computer network, such as the Internet, to which the meter 100 may be connected. A search for the detector's characteristic data can be performed based on the detector's serial number or other identification data, which can preferably be read from the detector 50.

Because it is expected that a user of the meter 100 will use the same detector 50 more than once, it is advantageous for the meter 100 to store the characteristic response curves or other dynamic response data for the last N (e.g., N=5) detectors 50 connected to the meter 100. Such data may be stored in the dynamic response data memory area 137, for example. This prevents the meter 100 from having to repeat steps to download or compute the model response for each detector 50.

Figure 6:
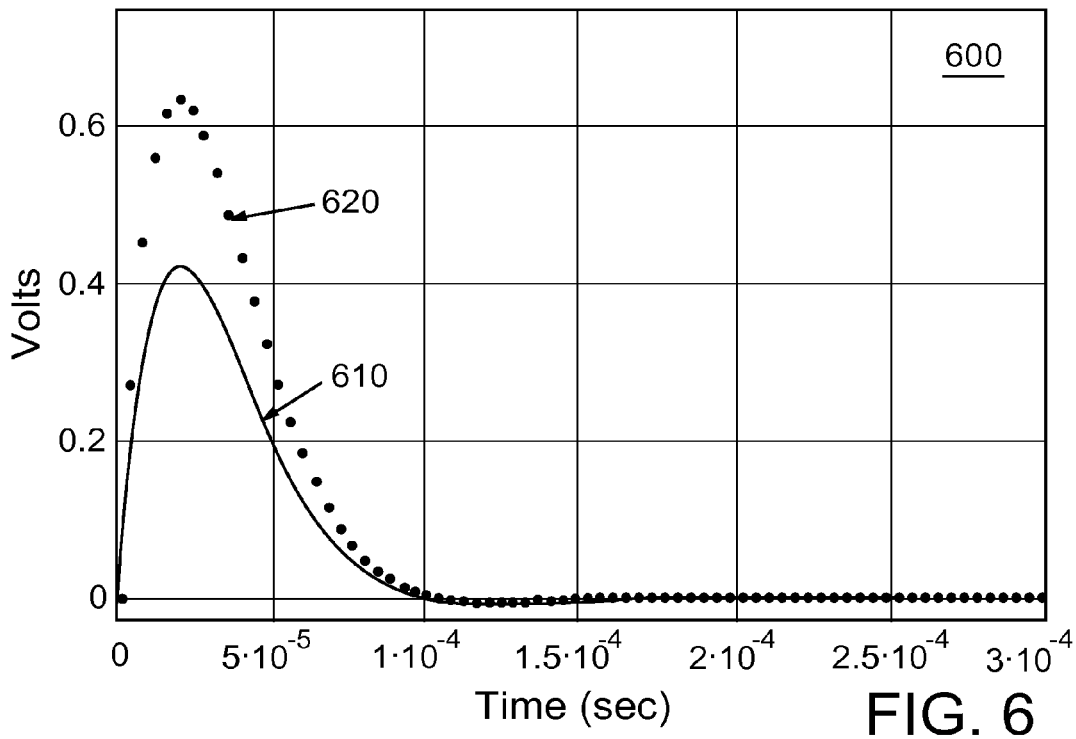
FIGS. 6 and 7 are graphs illustrating operation of one version of the method of FIGS. 4 and 5 from a signal-based perspective.
Figure 7:
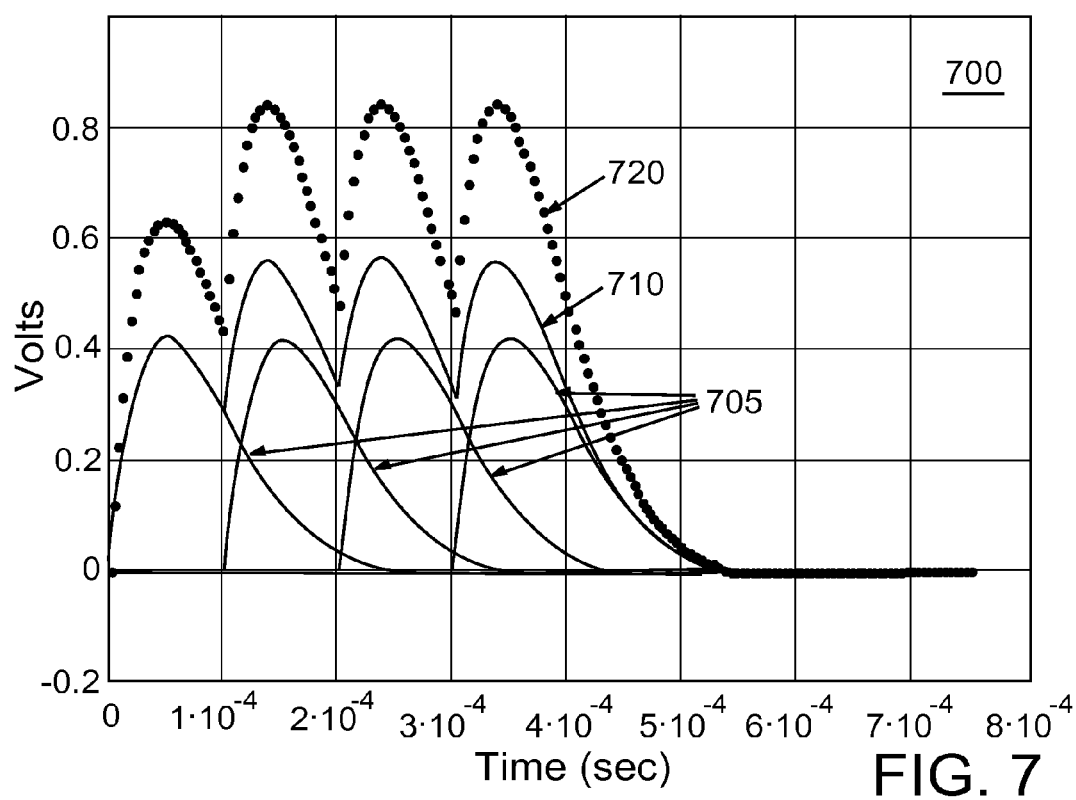

FIGS. 6 and 7 depict graphs 600 and 700 illustrating operation of this version of the method 400 from a signal-based perspective. The graphs 600 and 700 plot the detector's output signal 60 and the model response as functions of time. FIG. 6 shows a model single-pulse response 610 of the detector 50 in response to a known optical signal 35 having unit amplitude. FIG. 6 also illustrates what a response 620 of the detector 50 in response to a single-pulse optical signal 35 having an unknown characteristic (or known characteristic to be verified) to be measured, such as energy or power, might look like. As shown, the measured response 620 consists of samples of the detector's output signal 60 plotted versus time. The measured response 620 depicted in FIG. 6 is illustrative and not based on any actual measurements of the output of a real-world detector.

By comparing the model response 610 to the observed response 620, the energy and/or other characteristic(s) of the actual optical signal 35 can be ascertained. In particular, the ratio of the actual observed response 620 to the model response 610 at any point ideally equals the energy or power of the actual optical signal 35, scaled as necessary by a known gain or sensitivity factor for the detector 50. Because that is true at all points, it does not matter where the ratio is taken. That ratio can be calculated using the first or first few samples to quickly generate a preliminary measurement. To improve accuracy and measurement confidence, multiple ratios can be averaged. Because, noise tends to affect small signals more seriously than large signals, it may be desirable to compute ratios at points where the signals have relatively larger magnitudes, such as near the peaks of each signal. If desired, interpolation, regression, or curve-fitting techniques can be employed to estimate signal values between samples, and ratios of such estimates can be computed.

FIG. 7 illustrates what an actual observed response 720 might look like in relation to a model response 710 for a case in which the optical signal 35 incident upon the detector is a pulse train. In this illustrated case, the pulse repetition rate is 10 kHz. The model response 710 is the sum of several time-shifted versions of a single-pulse response 705. Notice that the pulse repetition rate is so high relative to the detector's response in this case that the single-pulse responses 705 substantially overlap on the graph 700. Physically, that means that the detector 50 does not have sufficient time for its output signal to dissipate back to zero before the next pulse in the optical signal 35 arrives. In this scenario, known prior art measurement techniques cannot discern the energy or power in the optical signal 35 by simply measuring the peak values in the observed response 720, because each peak in the observed response 720 contains energy from the preceding pulse(s). However, by comparing the observed response 720 to the model response 710, that information can be extracted. In particular, the ratio of the observed response 720 to the model response 710 at any point ideally (i.e., in the absence of noise and other distortions) equals the per-pulse energy or power.

The method 400 was performed by computer simulation and experimentally verified to assess its performance. Results of those simulations/experiments are depicted in FIGS. 8-12 and described next. In a first simulation/experiment, the detector 50 was a model 818E-10-25-L energy detector available from Newport Corporation, Irvine, Calif. The rise time of this detector is $T_r$=485 μs (485 millionths of a second) and its fall time $T_f$ is on the order of 5-6 ms (5-6 thousandths of a second), and a linear second-order model for the detector 50 was assumed. In each simulation/experiment, the optical signal 35 was set to be a single laser pulse having a Gaussian temporal profile, which is generally a good model of laser pulses. (If a different model is more appropriate for a particular optical signal, so be it; the method 400 can work with any arbitrary optical signal 35.)

Figure 8:
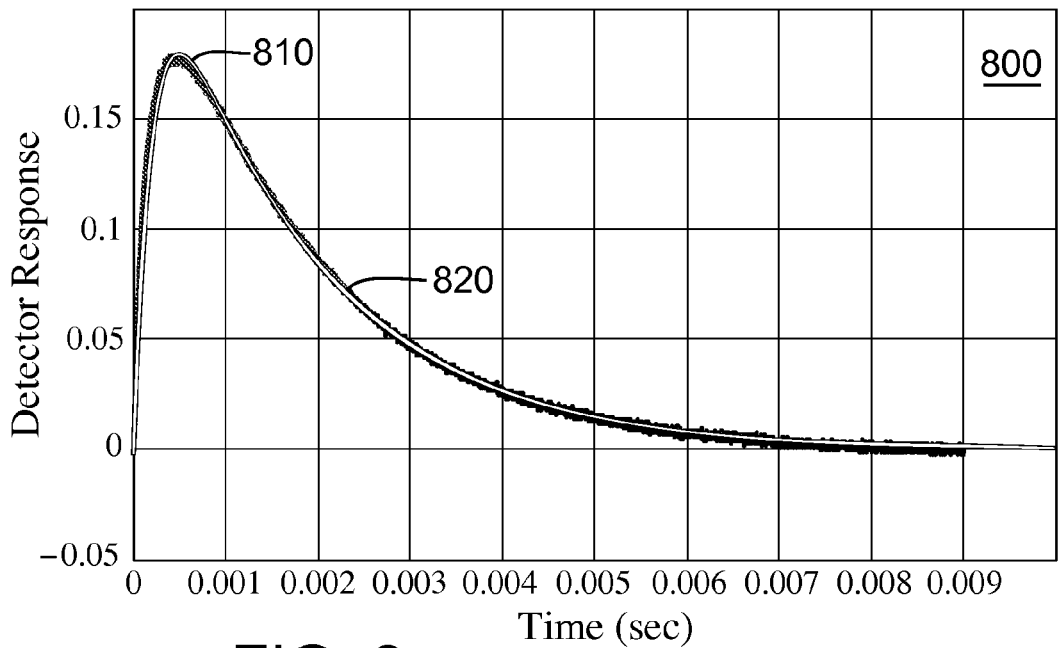
FIGS. 8, 9, 10, 11, and 12 are graphs of simulation-based experiments of the method of FIGS. 4 and 5.
Figure 9:
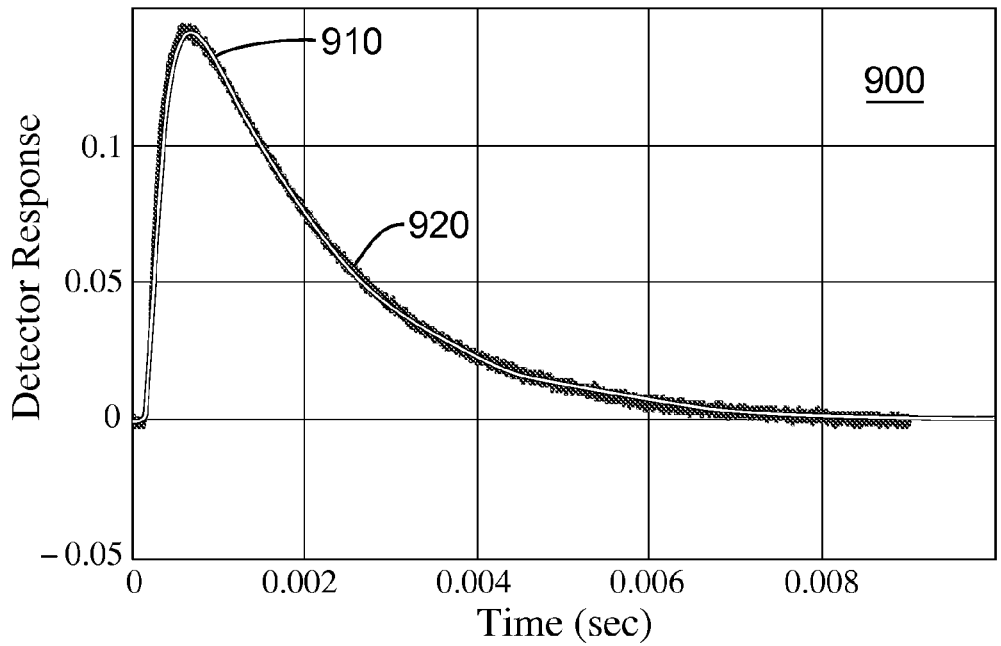

In a first simulation/experiment, the pulse width was set to be 6.6 ns (6.6 billionths of a second) (as measured at the 4σ width). Because this pulse width is several orders of magnitude smaller than the detector's rise time, one can assume that the optical signal 35 is a unit impulse and that the output of the detector 50 is its impulse response. In other words, the model response or characteristic curve of the detector 50 is its impulse response, and the convolving step 430 is not necessary in this case. FIG. 8 is a graph 800 of a scaled version of the computationally determined model response 810 (scaled by the energy determined by the method 400) and the actual response 820 of the detector 50 under these conditions. The observed response 820 was measured by a digital storage oscilloscope (DSO), while the scaled model response 810 was generated by computer simulation. FIG. 8 shows that the energy determined by the method 400 appears to be quite accurate. Analysis of these results revealed that the energy measured by the method 400 in this case was within about 0.838% of the actual energy, as independently measured by other means. The energy in this case was computed pursuant to the method 400 as an average of ratios of certain corresponding samples of the observed response 820 to the model response 810 generally within the first 1.5 ms of observation. Generally speaking, greater precision can be obtained by averaging more samples, while faster, less precise measurement results can be achieved by averaging over fewer samples. In this way, a user can trade off between measurement speed and precision.

In a second simulation/experiment, the same detector 50 was utilized, but the optical signal 35 was changed to have a pulse width of 168 μs. Because this pulse width is not much less than the detector's rise time, the input signal 35 was not assumed to be an impulse. Instead, the detector's model response was computed by convolving the detector model's impulse response with the 168-μs-wide pulse. The resultant model response 910 as well as the observed response 920, as measured by a DSO, are plotted on the graph 900 of FIG. 9. As this graph shows, the method 400 appears to perform well in this case.

Figure 10:
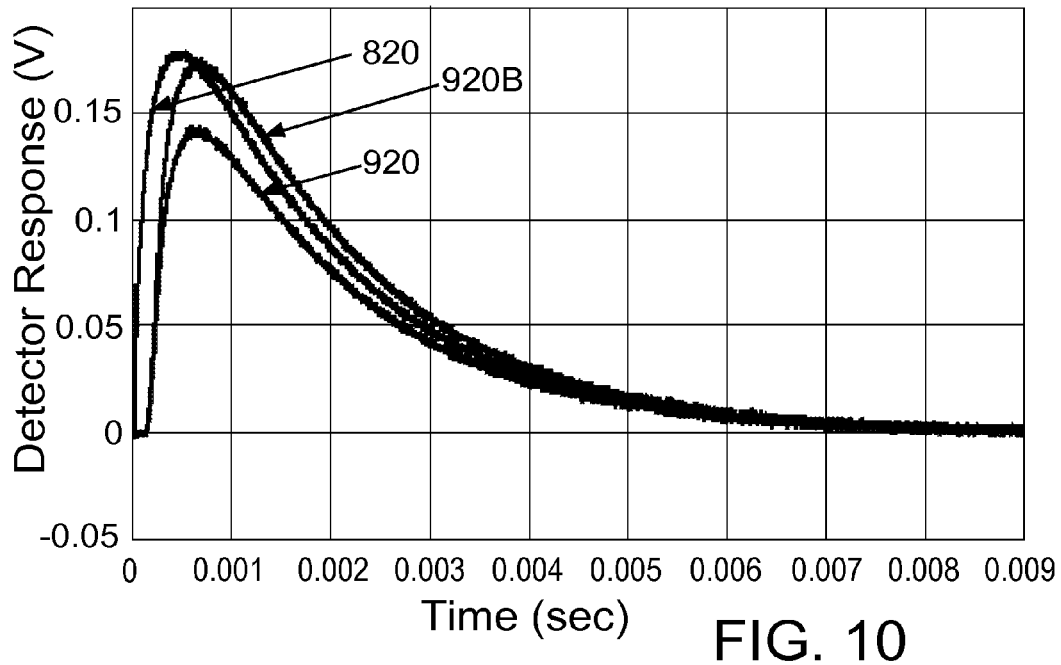
Figure 11:
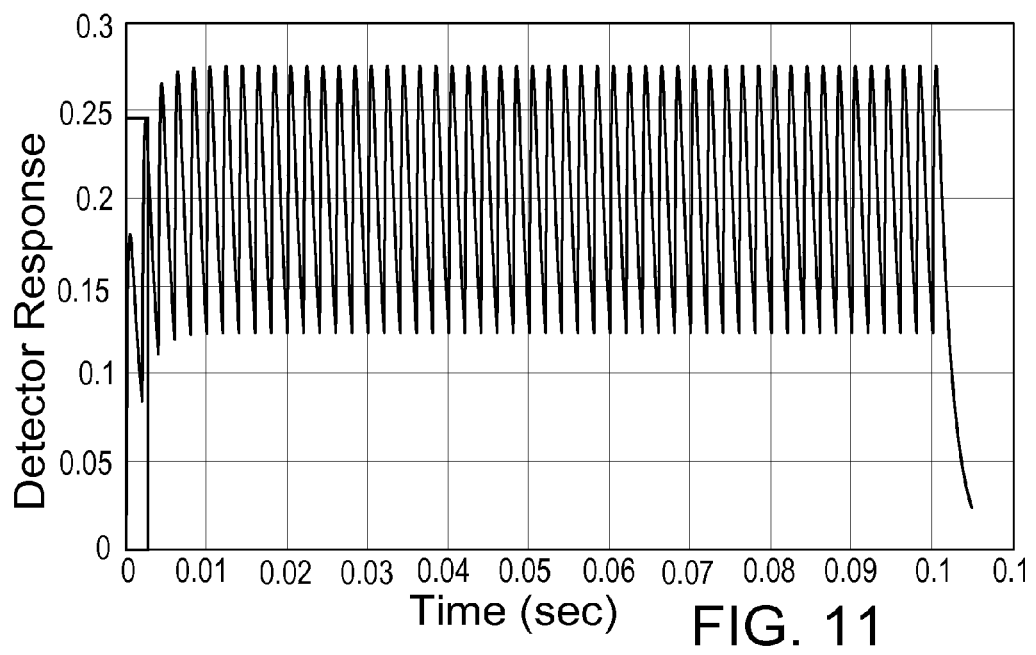

A third simulation/experiment was performed using the same detector 50 and a pulse having the same 168-μs temporal width but with significantly greater energy. The results were similar. FIG. 10 is a graph 1000 of a one-tenth scaled version of the detector's observed response 920B in this case, along with the observed responses 820 and 920 from the two prior experiments.

In a fourth simulation/experiment, the optical signal 35 was assumed to be a pulse train, rather than a single pulse. Using Equations 4 and 8, this simulation computed a model response 1110, which is illustrated on the graph 1100 in FIG. 11.

Figure 12:
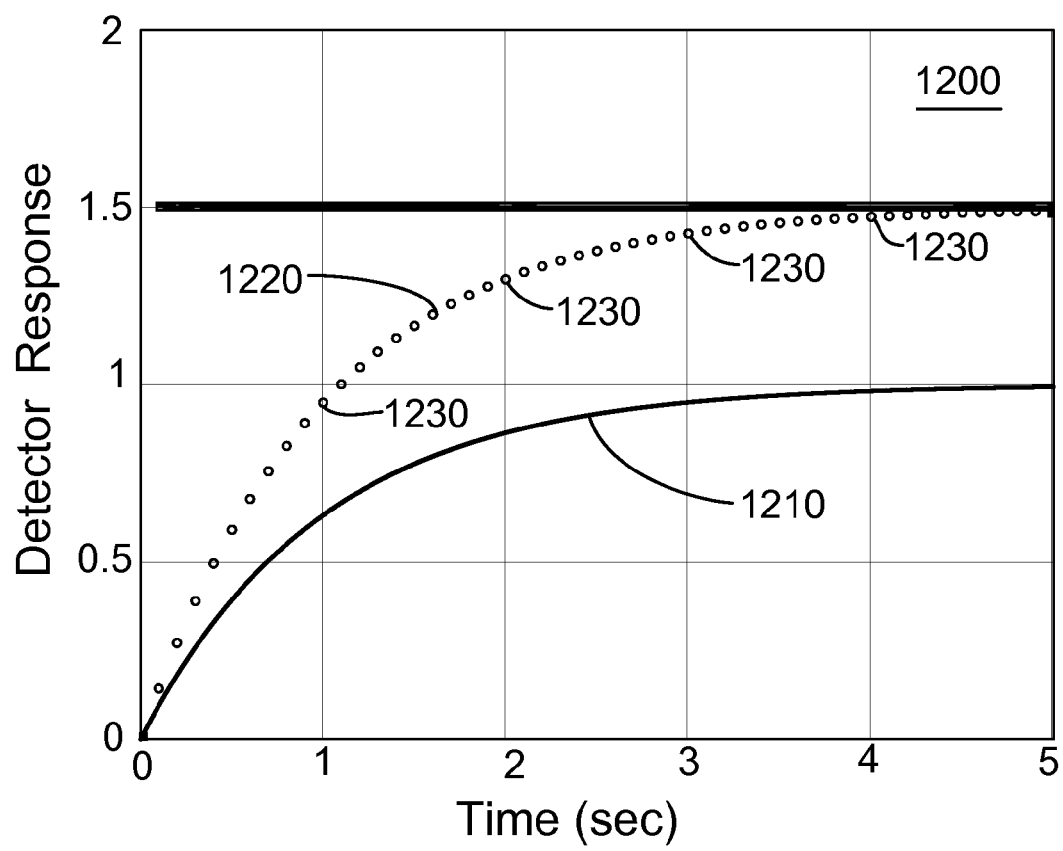

In a fifth simulation/experiment, the detector 50 was a thermopile detector and the quantity to be measured was power in the optical signal 35. This detector 50 was modeled using a first-order linear system model, as in Equation 5, with a known time constant σ=1 sec. FIG. 12 is a graph 1200 of this detector's model response 1210 and its observed output response signal 1220. As can be seen, the optical signal 35 has a greater power than the reference. The power can be measured by computing the ratio of any sample in the actual output response 1220 to the model response value at the same time. Notably, such ratios can be taken using the first or first few samples to get a very quick estimate, rather than waiting several seconds until the detector's response flattens out, as is necessary using conventional measurement techniques. As additional samples are acquired, the estimate can be refined averaging the ratios over an expanding set of sample points. This same principle applies to all manner of detectors but is especially valuable for slowly responding ones.

FIG. 12 also illustrates that measurements can be based on a relatively small number of sparsely distributed samples, such as every tenth sample 1230, as shown. This means that slower and less costly A/D converters 130 and other data meter hardware can be utilized to practice the method 400. In fact, adequately reliable measurements can be made in some instances with a very small number of samples or possibly even a single sample.

The algorithms for operating the methods and systems illustrated and described herein can exist in a variety of forms both active and inactive. For example, they can exist as one or more software or firmware programs comprised of program instructions in source code, object code, executable code or other formats. Any of the above can be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer-readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer-readable medium. The same is true of computer networks in general.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A machine for measuring an unknown characteristic of one or more optical pulses incident upon an optical detector characterized by one or more dynamic response parameters, the pulses having a known pulse repetition rate, the machine comprising:
   an input connection for receiving an output signal from the detector, the output signal resulting from the pulses being incident upon the detector;
   a memory in which are stored data related to said one or more dynamic response parameters; and
   a processor operatively connected to the memory and to the input connection, the processor being configured to calculate, on the basis of the stored data, a response of the detector to a train of optical pulses having the known pulse repetition rate and a known energy, the processor being further configured to compare the output signal from the detector to the calculated response and to measure the unknown characteristic on the basis of that comparison.

2. A machine as set forth in claim 1, wherein the unknown characteristic is power.

3. A machine as set forth in claim 1, wherein the unknown characteristic is energy.

4. A machine as set forth in claim 1, wherein the optical signal is a laser beam.

5. A machine as set forth in claim 1, wherein the detector is a pyroelectric detector.

6. A machine as set forth in claim 1, wherein the detector is a thermopile detector.

7. A machine as set forth in claim 1, further comprising: the detector.

8. A machine as set forth in claim 1, wherein said one or more dynamic response parameters are selected from the group consisting of gain, cutoff frequency, rise time, fall time, settling time, overshoot, break frequency, natural frequency, resonant frequency, damping ratio, pole, zero, coefficient, and nonlinear term.

9. A machine as set forth in claim 1, wherein the input connection comprises:
   a data acquisition module connected to the detector, the data acquisition module generating digital samples of the output signal; and
   a memory, connected to the data acquisition module, in which are stored the digital samples generated by the data acquisition module.

10. A machine as set forth in claim 9, wherein the data acquisition module operates at a sampling rate, and wherein the sampling rate is unrelated to said one or more dynamic response parameters.

11. A machine as set forth in claim 1, further comprising: an input device into which a user can enter input data.

12. A machine as set forth in claim 1, further comprising: a display on which the measured characteristic is displayed.

13. A machine as set forth in claim 1, wherein the pulse repetition rate is known a priori.

14. A machine as set forth in claim 1, further comprising:
   a pulse rate measuring circuit to determine the pulse repetition rate.

* * * * *